US010552768B2

(12) United States Patent
Liu

(10) Patent No.: US 10,552,768 B2
(45) Date of Patent: Feb. 4, 2020

(54) FLEXIBLE DEPARTURE TIME FOR TRIP REQUESTS

(71) Applicant: Uber Technologies, Inc., San Francisco, CA (US)

(72) Inventor: Yifang Liu, Burlingame, CA (US)

(73) Assignee: Uber Technologies, Inc., San Francisco, CA (US)

( * ) Notice: Subject to any disclaimer, the term of this patent is extended or adjusted under 35 U.S.C. 154(b) by 932 days.

(21) Appl. No.: 15/139,304

(22) Filed: Apr. 26, 2016

(65) Prior Publication Data

US 2017/0308819 A1 Oct. 26, 2017

(51) Int. Cl.
*G06Q 10/02* (2012.01)
*G06Q 10/10* (2012.01)

(52) U.S. Cl.
CPC ......... *G06Q 10/02* (2013.01); *G06Q 10/1093* (2013.01)

(58) Field of Classification Search
CPC .................................................... G06Q 10/02
See application file for complete search history.

(56) References Cited

U.S. PATENT DOCUMENTS

| 2007/0039662 A1* | 2/2007 | Shuey | G01D 21/00 141/94 |
| 2010/0114754 A1* | 5/2010 | Silvermann | G06Q 40/04 705/37 |
| 2010/0217680 A1* | 8/2010 | Fusz | G06Q 30/0283 705/26.1 |
| 2011/0196709 A1* | 8/2011 | Huang | B60R 25/00 705/4 |
| 2011/0231338 A1* | 9/2011 | Cooper | G06Q 40/06 705/36 R |
| 2012/0078672 A1* | 3/2012 | Mohebbi | G06Q 10/0631 705/7.12 |
| 2013/0185772 A1* | 7/2013 | Jaudon | H04L 67/08 726/4 |
| 2014/0006068 A1* | 1/2014 | Dawkins | G06Q 10/02 705/5 |
| 2014/0143300 A1* | 5/2014 | Karlsson | H04L 67/101 709/203 |
| 2014/0257934 A1* | 9/2014 | Chrzan | G06Q 30/0629 705/7.34 |

(Continued)

OTHER PUBLICATIONS

Xiong, Chenfeng, On Agent-Based Modeling: Multidimensional Travel Behavioral Theory, Procedural Models and Simulation-Based Applications, University of Maryland, 2015.*

*Primary Examiner* — Nathan Erb
(74) *Attorney, Agent, or Firm* — Fenwick & West LLP

(57) ABSTRACT

A travel coordination system allows a rider to request a trip with a flexible departure time. The rider can specify a pick-up location, a trip destination, a target trip price, and a departure timeframe for the trip. The travel coordination system attempts to assign the rider to a provider at a point in time during the departure timeframe when the trip price would be less than or equal to the target trip price. The travel coordination system may also guarantee that the rider will pay no more than the target trip price if the travel coordination system determines that the trip price is likely to be lower than the target trip price at some point in time during the departure timeframe.

20 Claims, 9 Drawing Sheets

(56) References Cited

U.S. PATENT DOCUMENTS

| | | | |
|---|---|---|---|
| 2015/0206267 A1* | 7/2015 | Khanna | G06Q 50/30 |
| | | | 705/5 |
| 2015/0363843 A1* | 12/2015 | Loppatto et al. | G06Q 30/0283 |
| | | | 705/330 |
| 2016/0292702 A1* | 10/2016 | Poornachandran | ................. |
| | | | G06Q 30/0202 |
| 2016/0350679 A1* | 12/2016 | Armstrong | G06Q 10/02 |
| 2018/0300660 A1* | 10/2018 | Coan | G01C 21/26 |

\* cited by examiner

FLEXIBLE DEPARTURE TIME FOR TRIP REQUESTS

BACKGROUND

This disclosure relates generally to travel coordination systems.

Travel coordination systems provide a means of travel by connecting people who need rides (i.e., "riders") with drivers (i.e., "providers"). A rider can submit a request for a trip to the travel coordination system and the travel coordination system selects a provider to service the request by transporting the rider to their intended destination.

SUMMARY

A travel coordination system allows a rider to request a trip with a flexible departure time. The rider can specify parameters for the trip, such as a pick-up location, a trip destination, a target trip price, and a departure timeframe for the trip. The travel coordination system attempts to assign the rider to a provider at a point in time during the departure timeframe when the trip price would be less than or equal to the target trip price.

Responsive to receiving a trip request from the rider, the travel coordination system generates an estimate of the trip price for a trip requested in a trip request. The travel coordination system may generate the trip price estimate using models of the trip price. These models may be based on underlying factors that can impact the trip price, such as the duration of the trip, the trip distance, the pick-up location, the destination, an approximate trip departure time, traffic conditions, the number of passengers on the trip, and the type of the provider servicing the trip. The travel coordination system may also generate the trip price estimate based on data corresponding to the supply of providers and data corresponding to the demand for trips in a geographic area within which the trip is to be initiated or take place.

The travel coordination system may continually generate the trip price estimate to monitor the trip price estimate during the departure timeframe. If, at some point in time during the departure timeframe, the trip price estimate is less than or equal to the target trip price, the travel coordination system assigns the rider to a provider. On the other hand, depending on examples, if the trip price estimate is not less than or equal to the target trip price within the departure timeframe, the travel coordination system may prompt the rider for a new trip request, or may assign the rider to a provider at the end of the departure timeframe.

The travel coordination system may also guarantee that the rider will pay no more than the target trip price if the travel coordination system determines that the trip price is likely to be lower than the target trip price at some point in time during the departure timeframe. In some embodiments, the travel coordination system guarantees that the rider will pay the minimum of the actual trip price or the target trip price. If the travel coordination system makes the guarantee and the trip price is greater than the target trip price, the travel coordination system may request payment for the target trip price, or may request payment for the actual trip price and provide the rider with the difference between the trip price and the target trip price in credits that can be used on a future trip with the travel coordination system.

By allowing riders to submit trip requests with flexible departures, the travel coordination system makes it more convenient for a rider to avoid times when the trip price might be higher than the rider would be willing to pay for the trip. Additionally, the travel coordination system more evenly distribute the times when it assigns riders to providers, thereby reducing the likelihood that the travel coordination system will be unable to assign a rider to a provider. Furthermore, the travel coordination system can also use the information about pending trip requests with flexible departure times to more effectively assign riders to providers.

DETAILED DESCRIPTION

Example System Environment and Architecture

Figure 1:
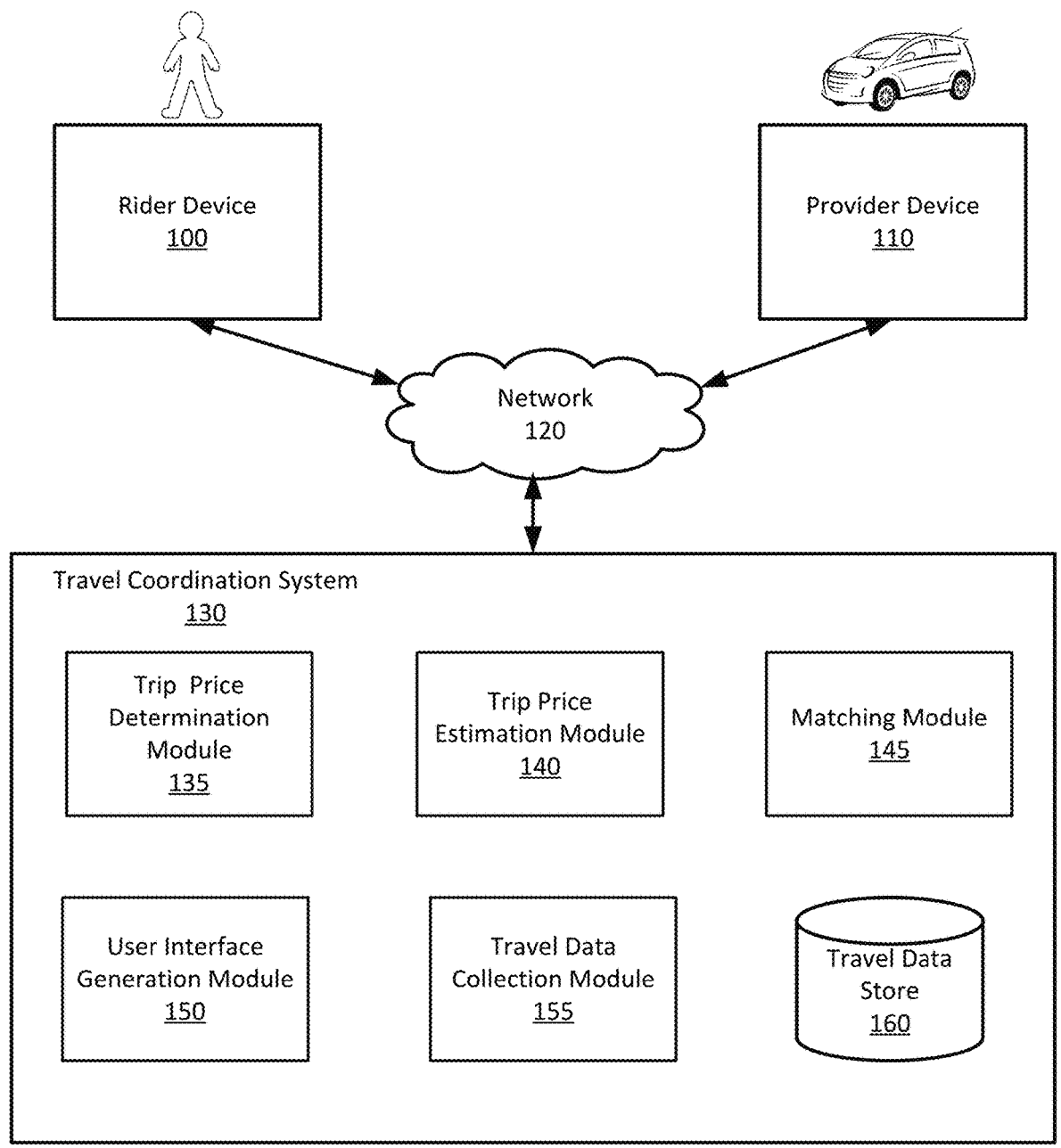
FIG. 1 illustrates a system environment and architecture of an example travel coordination system, in accordance with some embodiments.

FIG. 1 illustrates a system environment and architecture for a travel coordination system, in accordance with some embodiments. The illustrated environment includes a rider device 100, a provider device 110, a network 120, and a travel coordination system 130. In alternative configurations, different and/or additional components may be included in the system environment.

The travel coordination system 130 allows a rider to request a trip with a flexible departure time. The rider can specify parameters for the trip, such as a vehicle type, a pick-up location, a trip destination, a target trip price, and/or a departure timeframe for the trip. The travel coordination system 130 attempts to assign the rider to a provider at a point in time during the departure timeframe when the trip price would be less than or equal to the target trip price. The travel coordination system 130 may also guarantee that the rider will pay no more than the target trip price if the travel coordination system 130 determines that the trip price is likely to be lower than the target trip price at some point in time during the departure timeframe. By allowing a rider to specify a target price and departure timeframe, the travel coordination system 130 can more evenly distribute times when a trip for a rider is serviced, and can reduce the price of the trip for the rider by avoiding departure times when the trip price may be high.

By using the rider device 100, the rider can interact with the travel coordination system 130 to request a transportation service from a current location (or a specified pick-up location) to a destination location. While examples described herein relate to a transportation service, the travel coordination system 130 can enable other services to be requested by requesters, such as a delivery service, food service, entertainment service, etc., in which a provider is to travel to a particular location. As described herein, a rider device 100 and/or a provider device 110 can be a personal or mobile computing device, such as a smartphone, a tablet, or a computer. In some embodiments, the personal computing device executes a respective client application (e.g., a rider application or a provider application) that uses an application programming interface (API) to communicate with the travel coordination system 130 through the network(s) 120.

Through operation of the rider device 100, a rider can make a trip request to the travel coordination system 130. According to an example, a trip request can include rider identification information, the number of passengers for the trip, a requested type of the provider (e.g., a vehicle type or service option identifier), the current location and/or the pickup location (e.g., a user-specific location, or a current location of the rider device 100), and/or the destination for the trip. The current location of the rider device 100 may be designated by the rider, or detected using a location sensor of the rider device 100 (e.g., a global positioning system (GPS) receiver). The trip request can also include information that the travel coordination system 130 uses for a flexible departure time, such as a target trip price and a departure timeframe.

The provider can interact with, via the provider device 110, the travel coordination system 130 to connect with riders to whom the provider can provide transportation. In some embodiments, the provider is a person driving a car, bicycle, bus, truck, boat, or other motorized vehicle capable of transporting passengers. In some embodiments, the provider is an autonomous vehicle that receives routing instructions from the travel coordination system 130. For convenience, this disclosure generally uses a car with a driver as an example provider. However, the embodiments described herein may be adapted for these alternative providers.

A provider device 110 receives, from the travel coordination system 130, assignment requests to be assigned to transport a rider who submitted a trip request to the travel coordination system 130. For example, the travel coordination system 130 can receive a trip request from a rider device 100, select a provider from a pool of available (or "open") providers to provide the trip, and transmit an invitation message or assignment request to the selected provider's device 110. In some embodiments, a provider can decide to start receiving assignment requests by going online (e.g., launching a provider application and/or providing input on the provider application to indicate that the provider wants to receive invitations), and stop receiving assignment requests by going offline. In some embodiments, when a provider device 110 receives an assignment request, the provider has the option of accepting or rejecting the assignment request. By accepting the assignment request, the provider is assigned to the rider, and is provided the rider's pickup location and trip destination. In one example, the rider's pickup location and/or destination location is provided to the provider device 110 as part of the invitation or assignment request.

In some embodiments, the provider device 110 interacts with the travel coordination system 130 through a designated client application configured to interact with the travel coordination system 130. The client application of the provider device 110 can present information, received from the travel coordination system 130, on a user interface, such as a map of the geographic region, the current location of the provider device 110, an assignment request, the pickup location for a rider, a route from a pickup location to a destination, current traffic conditions, and/or the estimated duration of the trip. According to some examples, each of the rider device 100 and the provider device 110 can include location sensor, such as a global positioning system (GPS) receiver, that can determine the current location of the respective device (e.g., a GPS point). Each client application running on the rider device 100 and the provider device 110 can determine the current location and provide the current location to the travel coordination system 130.

The rider device 100 and provider device 110 communicate with the travel coordination system 130 via the network 120, which may comprise any combination of local area and wide area networks employing wired or wireless communication links. In one embodiment, the network 120 uses standard communications technologies and protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

The travel coordination system 130 provides travel coordination services between riders each operating a rider device 100 and providers each operating a provider device 110 in a given geographic region. The travel coordination system 130 includes a trip price determination module 135, a trip price estimation module 140, a matching module 145, a user interface generation module 150, a travel data collection module 155, and a travel data store 160. In alternative configurations, different and/or additional components may be included in the system architecture. Conventional components such as web servers, network interfaces, security functions, load balancers, failover servers, management and network operations consoles, and the like are not shown so as to not obscure the details of the system architecture.

The trip price determination module 135 determines the trip price of a trip coordinated by the travel coordination system 130. The trip price is the price that the rider pays for a trip using the travel coordination system 130 (e.g., price based on time and/or price based on distance for the particular geographic region or location). The trip price may be determined based on the duration of the trip, the distance traveled in the trip, the pick-up location, the destination, when the trip started, when the time of arrival at the destination, current traffic conditions, the number of passengers on the trip, and/or the type of the provider (e.g., the type of vehicle of the provider) servicing the trip. The trip price may also be determined based on the supply of providers and/or the demand for trips in the geographic region within which the trip takes place. For example, if many providers are available to provide trips as compared to the number of potential riders that may request trips, then the trip price may be lower. Similarly, if many riders are requesting trips as compared to the number of providers that are available to provide trips, the trip price may be higher. In some embodiments, the trip price is based on how the supply of providers compares with the demand for trips. For example, if the demand for trips within a geographic region is significantly higher than the supply of providers within the geographic region, the trip price may be higher due to the shortage of providers. In some embodiments, the trip price determination module 135 determines a scaling modifier (e.g., a multiplier) based on provider supply and trip demand, and applies the scaling modifier to an initial trip price to determine a final trip price.

The trip price determination module 135 may determine the trip price in real time as the trip is taking place, or after the trip has completed based on information gathered during the trip. In some embodiments, the trip price determination module 135 predetermines the trip price before the trip takes place. For example, the trip price determination module 135 may establish flat rates for trips that are taken regularly by a large number of riders, and therefore the trip determination module 135 can determine the trip price before the trip takes place based on the pick-up location and the destination.

The trip price estimation module 140 generates estimates of a price for a trip requested in a trip request. The trip price estimate represents an estimate of the trip price if rider was assigned to a provider at the point in time when the estimate was generated or at some future point in time. A trip price estimate can be a single determined price, or a range within which the trip price might be. In some embodiments, the trip price estimation module 140 determines the probability that the actual trip price will be less than or equal to the trip price estimate, or that the actual trip price will fall within the determined price range of the trip price estimate. The trip price estimation module 140 can also determine the probability that the actual trip price will be less than or equal to a target trip price specified in a trip request. The trip price estimation module 140 can also generate an estimate of the minimum trip price for a specified timeframe, and can estimate when that minimum trip price might occur.

The trip price estimation module 140 uses models of the trip price to generate a trip price estimate within a geographic region. In some embodiments, the trip price estimation module 140 separates the geographic region into zones, such as hexagons, and generates a model of the trip price in each zone. The trip price models can be based on underlying factors that can impact the trip price, such as the duration of the trip, the trip distance, the pick-up location, the destination, an approximate trip departure time, an estimated time of arrival at the destination, traffic conditions, the number of passengers on the trip, and/or the type of the provider servicing the trip. The trip price estimation module 140 may also use historical trip price data to generate the trip price estimate. For example, the trip price estimation module 140 may use historical traffic condition data to predict traffic during the trip, and how that traffic impacts the trip price. In some embodiments, the models of the trip price use time series analysis or stochastic model analysis to generate models of the trip price.

The trip price estimation module 140 may also generate the trip price estimate based on the supply of providers and demand for trips in a geographic region within which the trip takes place. The trip price estimation module 140 may generate models of the supply of providers and demand of trips to determine provider supply and trip demand during the trip. The provider supply models may consider provider supply factors, such as the number of providers in the zone, the rate at which providers are coming online/going offline, the rate at which providers are being assigned to riders, the rate at which providers are finishing trips, and/or the historical provider supply in the geographic region. The trip demand models may consider trip demand factors, such as the trip request rate, the assignment request rate, the number of riders currently viewing the client application, the rate at which riders who open the client application on the rider device 100 submit a trip request, and/or the historical trip demand in the geographic region.

The matching module 145 selects a provider to service the trip request of a rider. The matching module 145 receives a trip request from a rider through the rider device 100 and determines a set of candidate providers that are online, open (i.e., are available to transport a rider), and near the requested pickup location for the rider. The matching module 145 selects a provider from the set of candidate providers to which it transmits an assignment request. The provider can be selected based on the provider's location, the rider's pickup location, the type of the provider, the amount of time the provider has been waiting for an assignment request and/or the destination of the trip, among other factors. In some embodiments, the matching module 145 selects the provider who is closest to the pickup location or would take the least amount of time to travel to the pickup location (e.g., having the shortest estimated travel time). The matching module 145 sends an assignment request to the selected provider's device 110. In some embodiments, the provider device 110 always accepts the assignment request and the provider is assigned to the rider. In some embodiments, the matching module 145 awaits a response from the provider device 110 indicating whether the provider accepts the assignment request. If the provider accepts the assignment request, then the matching module 145 assigns the provider to the rider. If the provider rejects the assignment request, then the matching module 145 selects a new provider and sends an assignment request to the provider device 110 for that provider. In some embodiments, rather than requesting confirmation from the provider device 110, the travel coordination system 130 assigns the selected provider to the rider without express confirmation from the provider device 110.

The matching module 145 can receive trip requests for flexible departures from the provider through the provider device 110. A trip request for a flexible departure can include the pick-up location, the trip destination, a target price for the rider to pay for the trip, and a departure timeframe during which the rider wants to leave. The departure timeframe may contain only a single time before which the rider wants to leave, or may contain two times between which the rider wants to leave.

Upon receiving a trip request for a flexible departure, the matching module 145 monitors a trip price estimate generated by the trip price estimation module 140. In some embodiments, the matching module 145 monitors a trip price estimate that is generated by the trip price estimation module 140 as conditions in the geographic region containing the trip change. If the trip price estimate is less than or equal to the target price in the trip request at some point in time during the departure timeframe, the matching module 145 assigns the rider to a provider that can service the trip request. If the trip price estimate is not less than or equal to the target price during the departure timeframe, the matching module 145 may assign the rider to a provider at the end of the departure timeframe, or may make no match. Alternatively, the matching module 145 may inform the rider that the trip price estimate was not less than or equal to the trip price during the departure timeframe, and may prompt the user to submit a new trip request. If the matching module 145 assigns the rider to a provider, the trip price determination module 135 determines the actual trip price for the trip and charges the rider for the actual trip price.

In some embodiments, the matching module 145 guarantees that the rider will pay no more than the target trip price if the matching module 145 determines that the trip price is likely to be lower than the target price at some point in time during the departure timeframe. In these cases, upon receiving the trip request, the matching module 145 queries the trip price estimation module 140 for the probability that the trip price will be less than the target price during the departure timeframe. The trip price estimation module 140 determines the probability and the matching module 145 determines whether to guarantee based on the determined probability. In some embodiments, the matching module 145 uses a threshold for the probability to determine whether to guarantee the trip at the target price. If the matching module 145 determines not to guarantee the trip, the matching module 145 instructs the rider device 100 to display a prompt to notify the rider to request a new trip request.

If the matching module 145 guarantees the trip, the matching module 145 instructs the rider device 100 to alert the rider that the trip request was accepted at the target price during the departure timeframe. The matching module 145 monitors a trip price estimate generated by the trip price estimation module 140 and, if the trip price estimate is less than or equal to the target trip price at a point in time during the departure timeframe, the matching module 145 assigns the rider to a provider at that point in time. If the trip price estimate is not less than or equal to the target trip price during the departure timeframe, the matching module 145 assigns the rider to a provider at the end of the departure timeframe.

In some embodiments, the trip price determination module 135 always charges the rider for the target trip price when the matching module 145 accepts the trip request. In some embodiments, the trip price determination module 135 determines the actual trip price when the trip takes place and charges the rider for a minimum of the actual trip price and the target trip price. In some embodiments, if the actual trip price is greater than the target trip price, the trip price determination module 135 may charge the rider for the actual trip price and provide an account for the rider with an amount of credits that can be used for future trips with the travel coordination system 130. In these cases, the amount of credits provided to the rider is equal to the difference between the actual trip price and the target trip price.

The user interface generation module 150 provides a frontend interface for the travel coordination system 130 to communicate via the network 120 with the rider device 100 and the provider device 110. The user interface generation module 150 may provide application programming interface (API) functionality to send data directly to native client device operating systems, such as IOS®, ANDROID™, WEBOS®, or RIM®. The user interface generation module 150 may receive and route messages between the travel coordination system 130, the rider device 100, and the provider device 110. Additionally, the user interface generation module 150 can serve web pages, as well as other web-related content, such as JAVA®, FLASH®, XML, and so forth.

The user interface generation module 150 can provide a user interface to the rider for submitting a trip request with a flexible departure through the rider device 100. The user interface generation module 150 can instruct the rider device 100 to display a user interface that enables the rider to specify a pick-up location, a destination, a target price, and/or a departure timeframe. The user interface generation module 150 may also provide the rider with geographic information for the area around the rider and an interface through which the rider can provide payment information.

The user interface generation module 150 can also provide a user interface to the provider through the provider device 110. The user interface generation module 150 can send assignment requests to the provider device 110 on behalf of the matching module 145 and may receive responses to the assignment requests from the provider device 110. The user interface generation module 150 may also provide an interface, via the provider client application, on which the provider's geographic location is displayed, and provide trip directions to the provider when the provider is driving a rider.

The travel data collection module 155 collects data about geographic regions in which the travel coordination system 130 matches riders with providers. The travel data collection module 155 may collect data using the rider device 100, the provider device 110, or from third party systems. Data collected by the travel data collection module 155 can include rider profile data, provider profile data, traffic condition data, provider supply data, and provider demand data. The travel data collection module 155 may also collect information about trips taken using the travel coordination system 130, such as the start and end locations of trips, the start and end times of trips, identification information of the rider and provider, the distance and duration of the trip, the number of passengers on the trip, the time at which the rider requested the trip, the route taken on the trip, or the price of the trip. In addition, the travel data collection module 155 may collect data used to determine or estimate a trip price, such as provider supply data, trip demand data, and traffic condition data.

The travel data store 160 stores data collected by the travel data collection module 155. The travel data store 160 may also store data generated by the travel coordination system 130, such as models for the trip price. In some embodiments, the travel data store 160 stores historical data that is used to generate models of the trip price. The travel data store 160 may categorize data based on a particular geographic region, a rider, or a provider with which the data is related.

Providing Flexible Departure

Figure 2A:
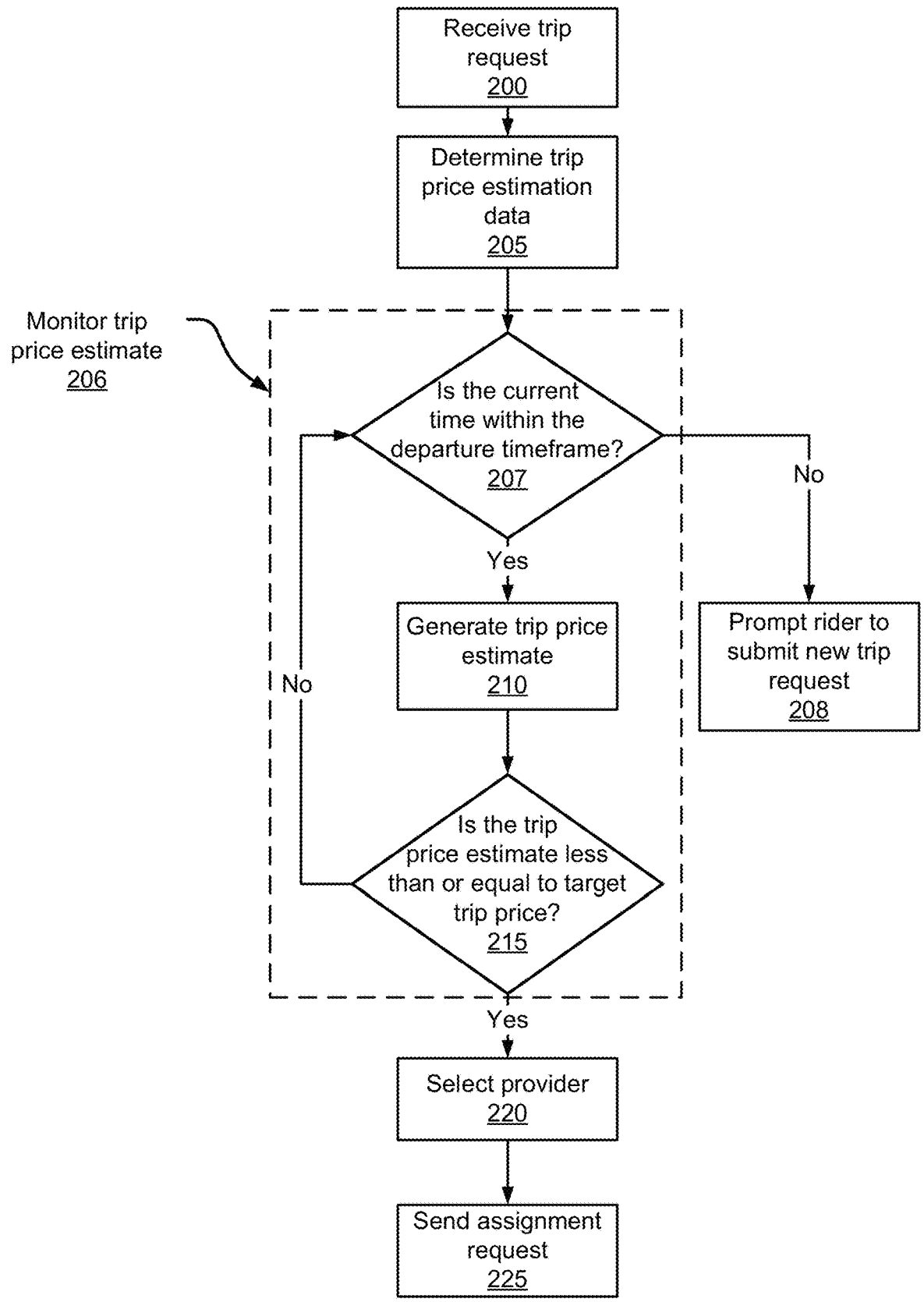
FIG. 2A illustrates a flowchart describing a method for providing a trip with a flexible departure, in accordance with some embodiments.

FIG. 2A illustrates a flowchart describing a method for providing flexible departure times to a rider, in accordance with some embodiments. The method described by FIG. 2A may be performed by the various components of the travel coordination system 130. In other embodiments, the method may include different, additional, or fewer steps than those shown in FIG. 2A. Additionally, steps of the method may be performed in different orders than the order described in conjunction with FIG. 2A in various embodiments.

The travel coordination system 130 receives 200 a trip request from a rider for a trip with a flexible departure time. The trip request can include a target trip price, a departure timeframe, a pick-up location for the rider, and/or the destination of the trip. The travel coordination system 130 also determines 205 trip price estimation data, which can be based, at least in part, on data corresponding to the demand for trips within a geographic region around the rider, data corresponding to the supply of providers in the geographic region, and/or traffic data corresponding to the traffic conditions in the geographic region.

The travel coordination system 130 monitors 206 an estimate of the trip price during the departure timeframe. To monitor the trip price estimate, the travel coordination system 130 determines 207 whether the current time is within the departure timeframe. If the current time is no longer within the departure timeframe, the travel coordination system 130 prompts 208 the rider to submit a new trip request. Alternatively, the travel coordination system 130 may assign the rider to a provider at the end of the departure timeframe.

If the current time is within the departure timeframe, the travel coordination system 130 generates 210 an estimate of the trip price. The trip price estimate represents an estimate of the trip price if the travel coordination system 130 assigned a provider to the rider at the point in time when the estimate was generated. The trip price estimate may be generated based on the departure timeframe, the pick-up location of the rider, the destination of the trip, the duration of the trip, the distance of the trip, the demand for trips within the geographic region, and the supply of providers in the geographic region. In some embodiments, the travel coordination system 130 generates the trip price estimate by applying models of the trip price to trip price estimation data received by the travel coordination system 130.

The travel coordination system 130 determines 215 whether the generated trip price estimate is less than the target trip price included with the trip request. If the trip price estimate is not less than the target price at the point in time when the trip price estimate is generated, the travel coordination system 130 continues to monitor 206 the trip price estimate. If the trip price estimate is less than or equal to the target trip price during the departure timeframe, the travel coordination system 130 selects 220 a provider and sends 225 an assignment request to the provider to assign the provider to the rider.

Providing Flexible Departure with Guaranteed Trip Price

Figure 2B:
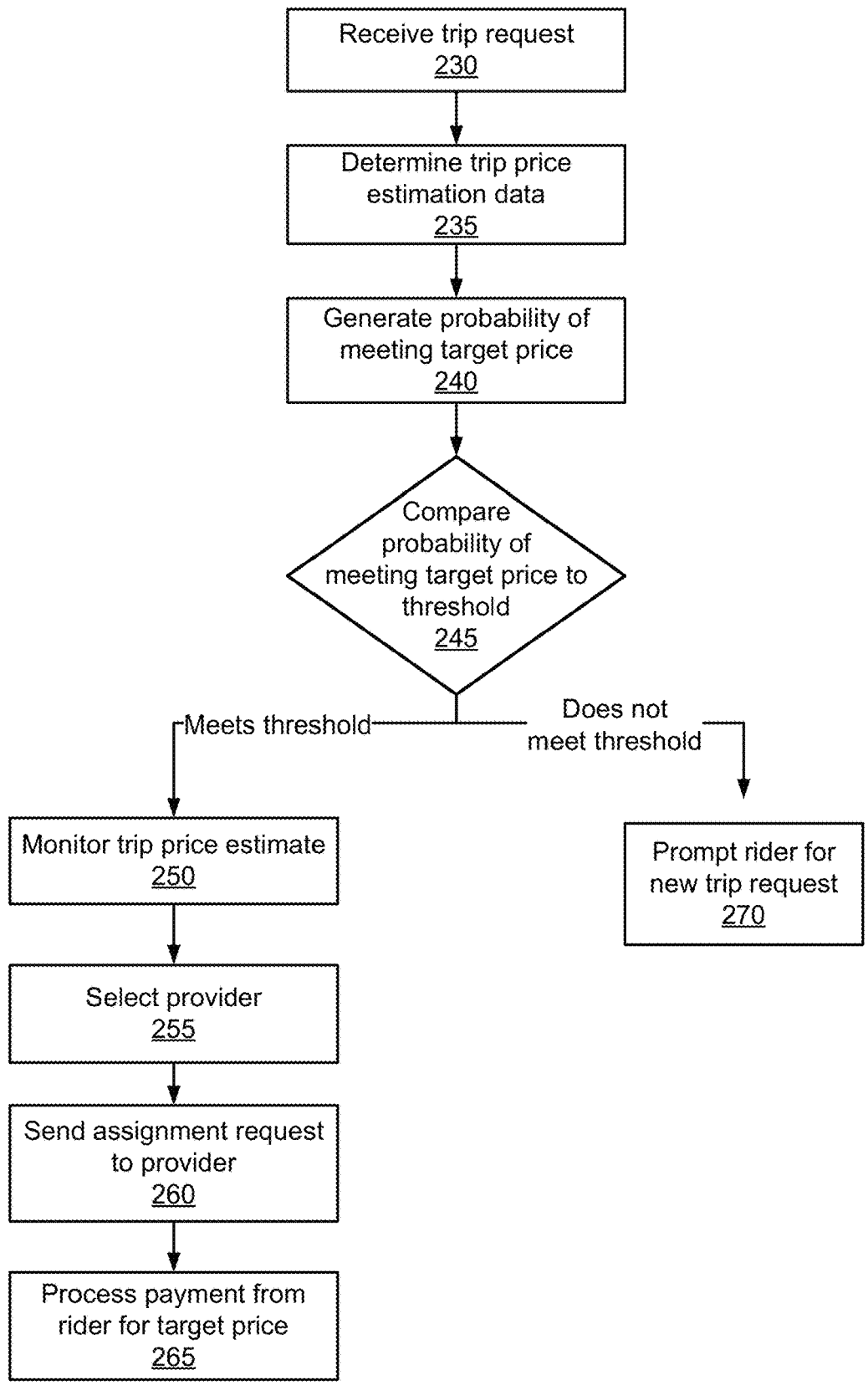
FIG. 2B is a flowchart illustrating a method for providing a trip with a flexible departure and a guaranteed trip price, in accordance with some embodiments.

FIG. 2B is a flowchart illustrating a method for providing a trip with a flexible departure and a guaranteed trip price, in accordance with some embodiments. The method described by FIG. 2B may be performed by the various components of the travel coordination system 130. In other embodiments, the method may include different, additional, or fewer steps than those shown in FIG. 2B. Additionally, steps of the method may be performed in different orders than the order described in conjunction with FIG. 2B in various embodiments.

The travel coordination system 130 receives 200 a trip request from a rider for a trip with a flexible departure time. The trip request can include a target trip price, a departure timeframe, a pick-up location for the rider, or the destination of the trip. The travel coordination system 130 also determines 205 trip price estimation data, which can be based, at least in part, on data corresponding to the demand for trips within a geographic region around the rider, data corresponding to the supply of providers in the geographic region, and traffic data corresponding to traffic conditions in the geographic region.

The travel coordination system 130 generates 240 a probability of the travel coordination system 130 satisfying the target price included in the trip request during the departure timeframe. The probability may be generated based on one or more models of the trip price, which may be based on the departure timeframe, the pick-up location of the rider, the destination of the trip, the duration of the trip, the distance of the trip, the demand for trips within the geographic region, and/or the supply of providers in the geographic region.

The travel coordination system 130 compares 245 the probability of meeting the target price to a threshold probability. If the probability does not meet the threshold probability, the travel coordination system 130 prompts 270 the rider for a new trip request. If the probability meets the threshold probability, the travel coordination system 130 monitors 250 the trip price estimate during the departure timeframe. At some point during the departure timeframe, the travel coordination system 130 selects 255 a provider to assign to the rider. The travel coordination system 130 may select the provider at the end of the departure timeframe, or when the trip price estimate is less than or equal to the target trip price. The travel coordination system 130 sends 260 an assignment request to the selected provider to assign the provider to the rider.

In some embodiments, the travel coordination system 130 processes 265 a payment from an account for the rider for the target trip price. In other embodiments, the travel coordination system 130 determines the actual trip price, processes payment from the rider for the actual trip price, and provides the user with the difference between the actual trip price and the target trip price in credits that can be used for future trips through the travel coordination system 130.

Example Trip Request with Flexible Departure

Figure 3:
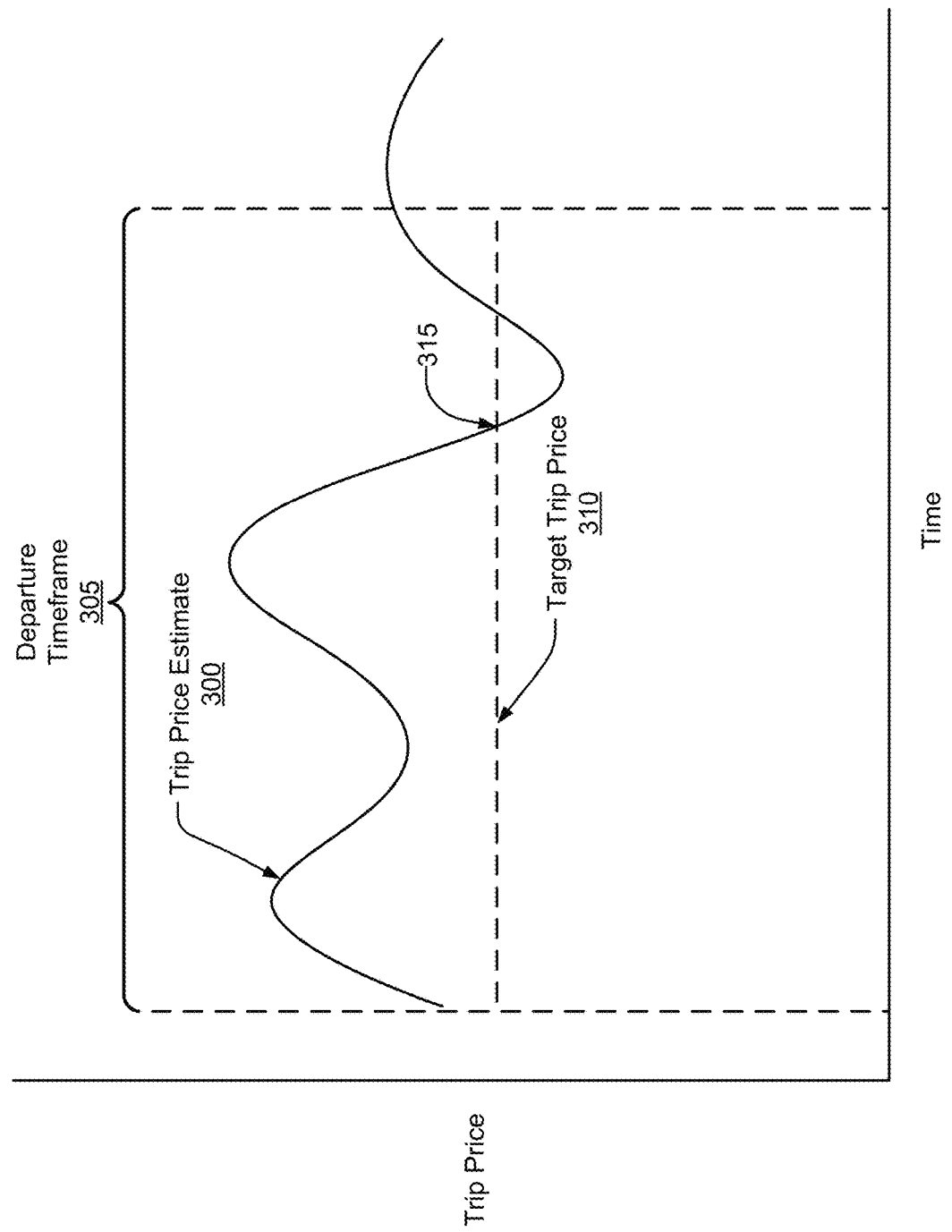
FIGS. 3 and 4 are graphs that illustrate the trip price estimate for a trip request with a flexible departure, in accordance with some embodiments.
Figure 4:
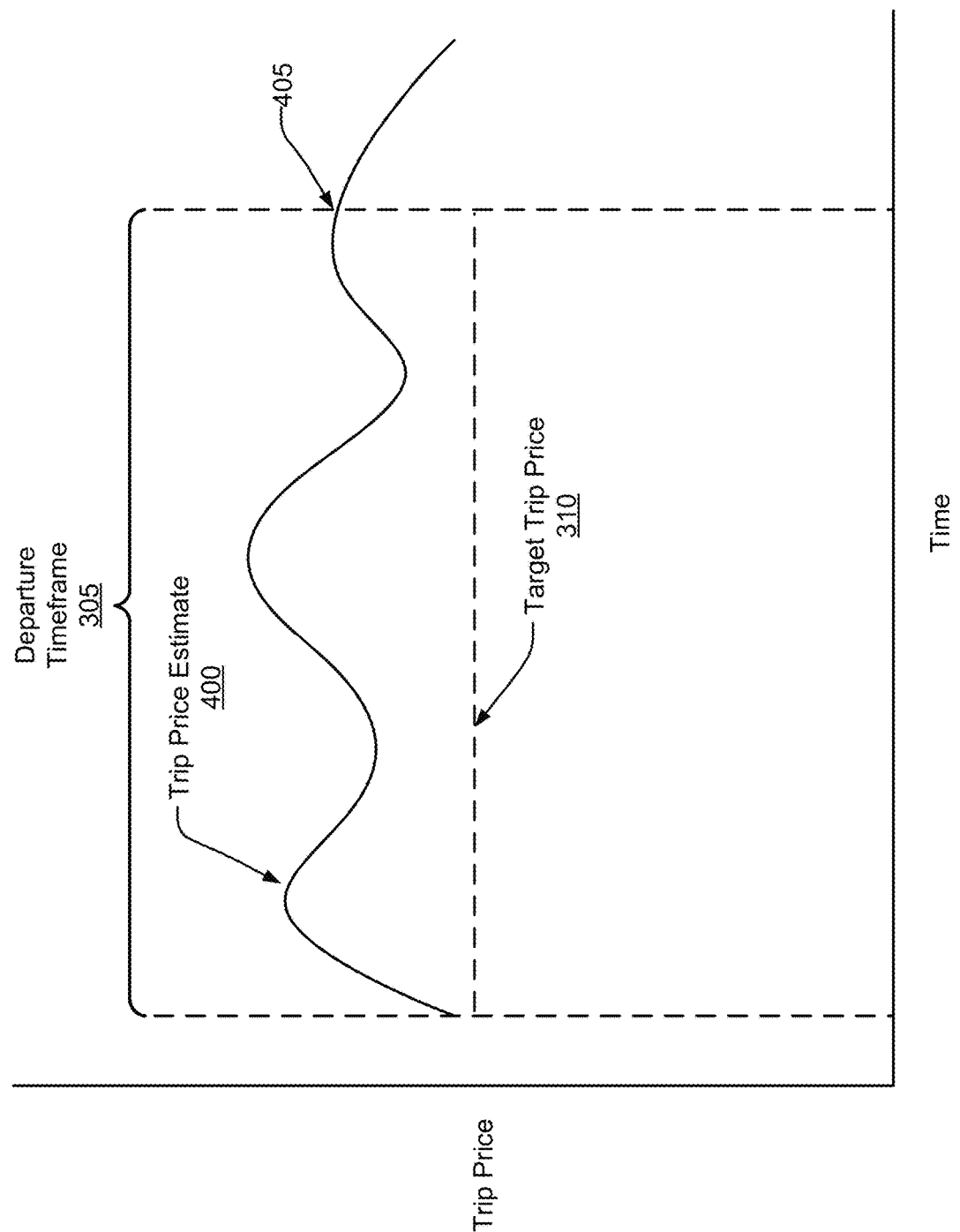

FIGS. 3 and 4 are graphs that illustrate the trip price estimate for a trip request with a flexible departure, in accordance with some embodiments.

Referring to FIG. 3, a graph of a trip price estimate 300 is illustrated, along with the departure timeframe 305 and the target trip price 310. In this example, the travel coordination system 130 generates a trip price estimate 300 during the departure timeframe, and monitors the trip price estimate 300 to determine when the trip price estimate 300 is less than or equal to the target trip price 310. If the trip price estimate 300 is below or at the target trip price, as it is at time 315, the travel coordination system 130 assigns a provider to the rider. In one example, the trip price estimate 300 can correspond to a multiplier (e.g., 1.5× or 2.2×, etc.) of a default price at the geographic region encompassing the rider's pick-up location.

FIG. 4 shows a different example trip price estimate 400 plotted over time. The travel coordination system 130 monitors the trip price estimate 400 during the departure timeframe 305, however, in this case, the trip price estimate 400 is not less than or equal to the target trip price 310 within the departure timeframe. The travel coordination system 130 may assign the rider to a provider at 405 at the end of the departure timeframe 305, or may prompt the rider to submit a new trip request.

Example User Interfaces

Figure 5:
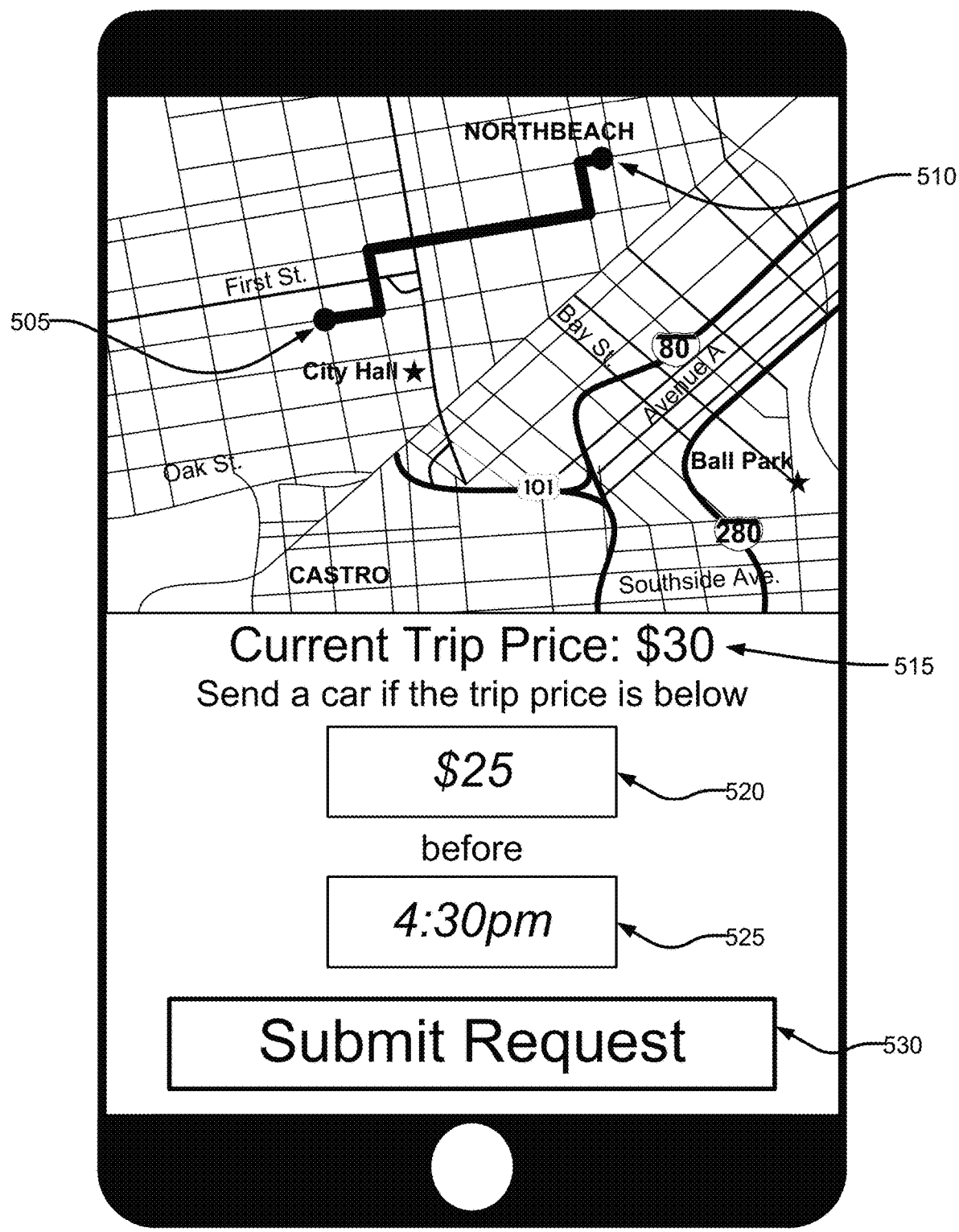
FIG. 5 illustrates an example user interface for submitting a trip request wherein the rider provides both a target trip price and departure timeframe, in accordance with some embodiments.
Figure 6:
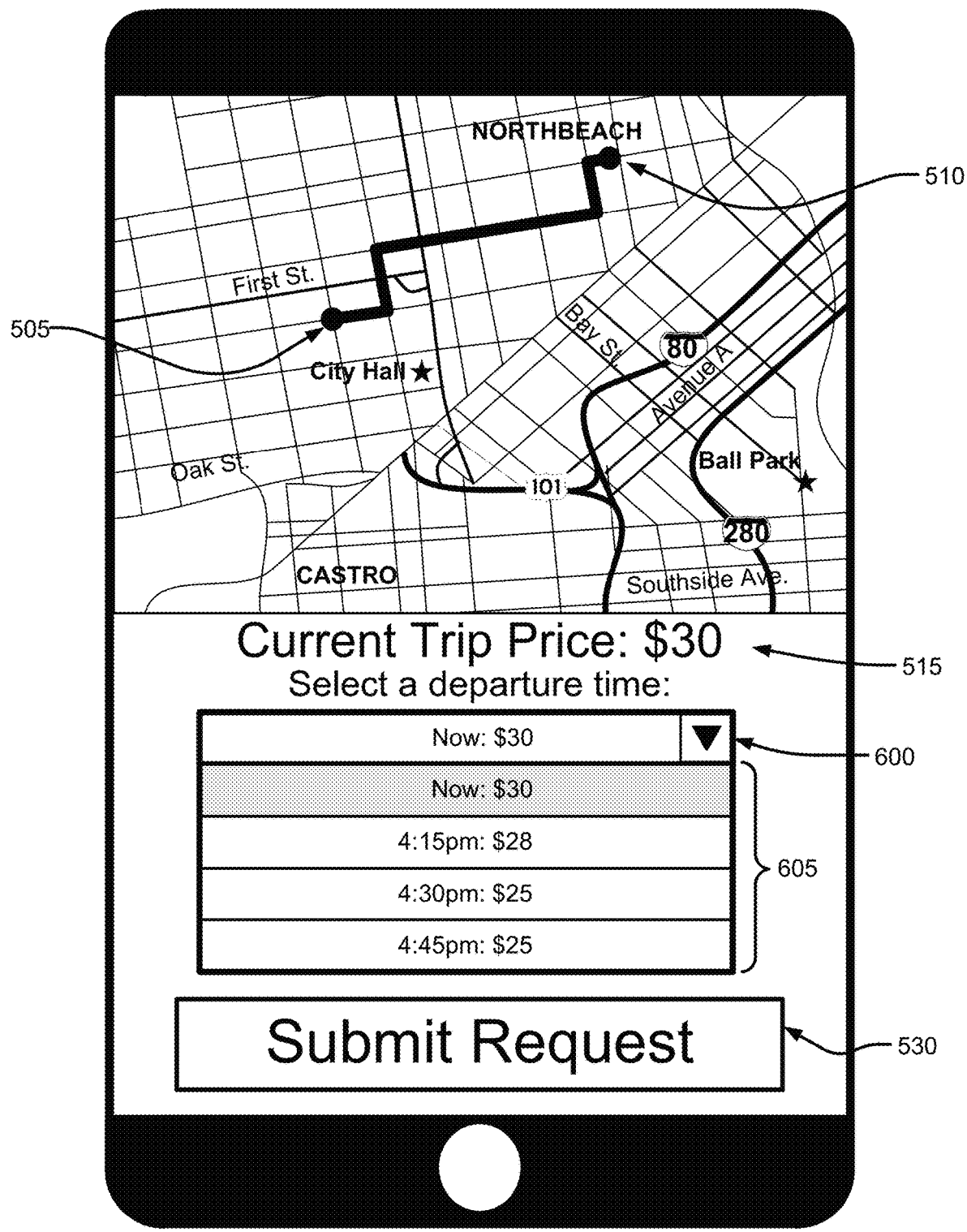
FIG. 6 illustrates an example user interface for submitting a trip request wherein the travel coordination system provides trip price estimates for a set of departure timeframes, in accordance with some embodiments.

FIGS. 5 and 6 illustrate example user interfaces to submit a trip request with a flexible departure time, in accordance with some embodiments. FIGS. 5 and 6 represent example user interfaces that are displayed to a rider through a mobile application operating on the rider device 100. The trip requests submitted using the user interfaces described in FIGS. 5 and 6 may be submitted in accordance with the method described in FIG. 2A of this disclosure or in accordance with FIG. 2B of this disclosure.

FIG. 5 illustrates an example user interface for submitting a trip request wherein the rider provides both a target trip price and departure timeframe, in accordance with some embodiments. The user interface displays a map of the geographic area around the rider. The user interface also displays the pick-up location 505 and the trip destination 510 specified by the rider.

The travel coordination system 130 determines a trip price estimate 515 if the rider were to be assigned to a provider immediately (e.g., based on the pick-up location 505 and the trip destination 510), and the user interface displays the trip price estimate 515 to the rider. The user interface also provides interfaces through which the rider can specify the target trip price 520 and the departure timeframe 525. In the embodiment shown in FIG. 5, the user interface allows a rider to specify a time before which the rider wants to be assigned to a provider. For example, FIG. 5 shows a rider requesting to be assigned to a provider if the trip price estimate is less than or equal to $25 between the current time and 4:30 pm. Alternatively, the user interface may allow the user to specify a start and an end time for the departure timeframe. For example, the rider may instead request to be assigned to a provider if the trip price estimate is less than or equal to $25 sometime between 4:15 pm and 4:30 pm. The user interface also provides an interface 530 for the rider to submit the trip request with the specified target trip price and departure timeframe.

FIG. 6 illustrates an example user interface for submitting a trip request when the travel coordination system 130 provides trip price estimates for a set of suggested departure timeframes 605. The rider can select a departure timeframe 605 from a dropdown menu 600, wherein the time displayed in the dropdown menu is the time by which the rider wants to be assigned to a provider. The travel coordination system 130 generates an estimate for the minimum trip price within each departure timeframe. For example, if the rider wanted to be assigned to a provider immediately, the rider would likely have to pay $30 dollars for the trip. However, if the rider's departure time is flexible and the rider would be willing to be assigned to a provider sometime between the current time and 4:30 pm, the rider would likely only have to pay $25. If the user selects the submit button 530, the rider device 100 submits a trip request to the travel coordination system 130 that includes the specified departure timeframe 605 and a target trip price equal to the trip price estimate associated with the departure timeframe 605.

Example Hardware Architecture

Figure 7:
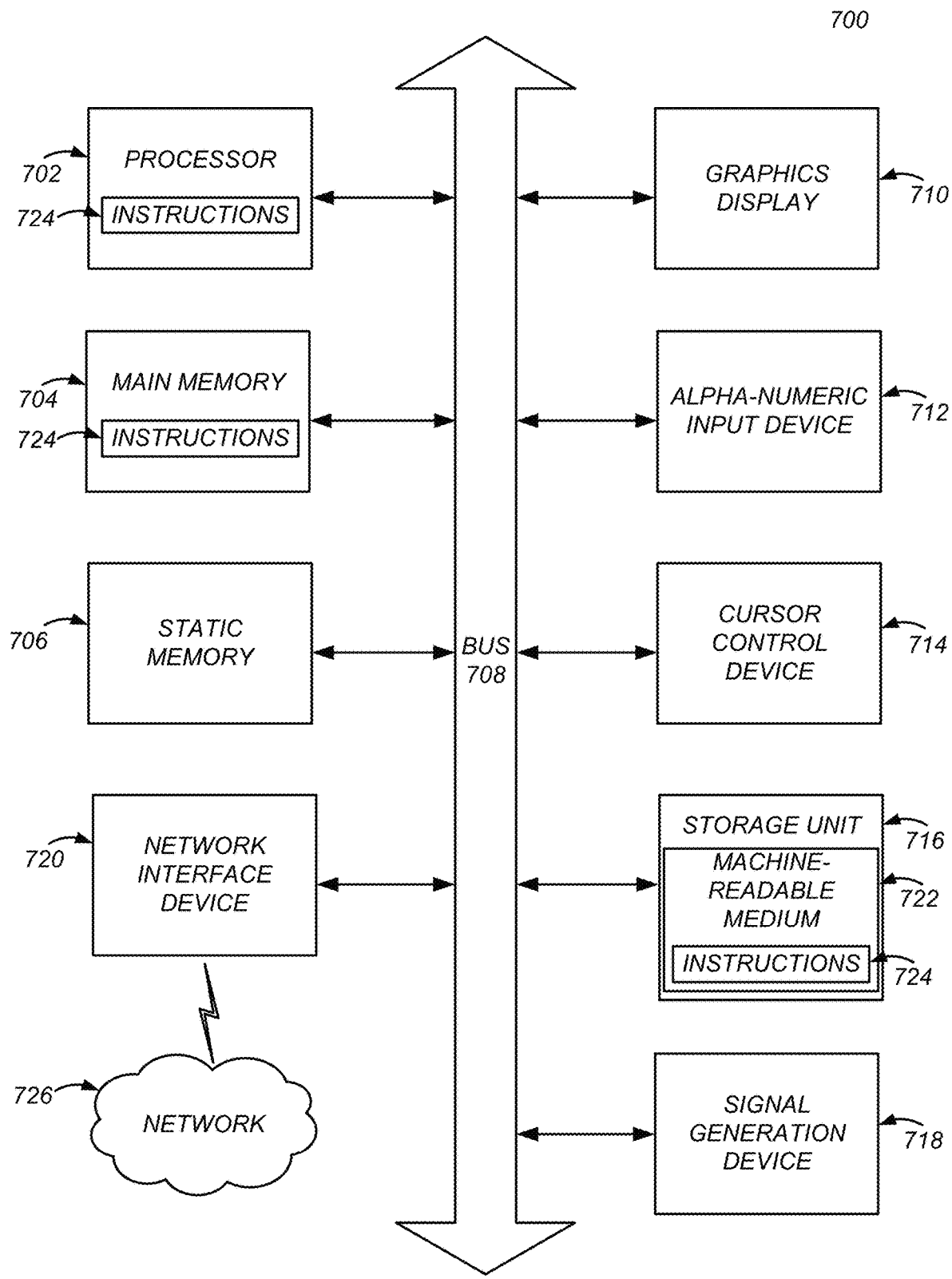
FIG. 7 illustrates an example hardware architecture of a computer system, such as a travel coordination system, in accordance with some embodiments.

FIG. 7 illustrates an example hardware architecture of a computer system 700, such as a travel coordination system 130, in accordance with some embodiments. The illustrated computer system 700 includes a processor 702, a main memory 704, a static memory 706, a bus 708, a graphics display 710, an alpha-numeric input device 712, a cursor control device 714, a storage unity 716, a signal generation device 718, and a network interface device 720. In alternative configurations, additional, fewer, or different components may be included in computer system 700 than those described in FIG. 7.

The computer system 700 can be used to execute instructions 724 (e.g., program code or software) for causing the computer system 700 to perform any one or more of the methodologies (or processes) described herein. In alternative embodiments, the computer system 700 operates as a standalone device or a connected (e.g., networked) device that connects to other computer systems 700. In a networked deployment, the computer system 700 may operate in the capacity of a server machine.

The computer system 700 may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated in FIG. 7, the term "computer system" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704 and the storage unit 716 communicate via a bus 708.

In addition, the computer system 700 can include a static memory 706, a display driver 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Figure 8:
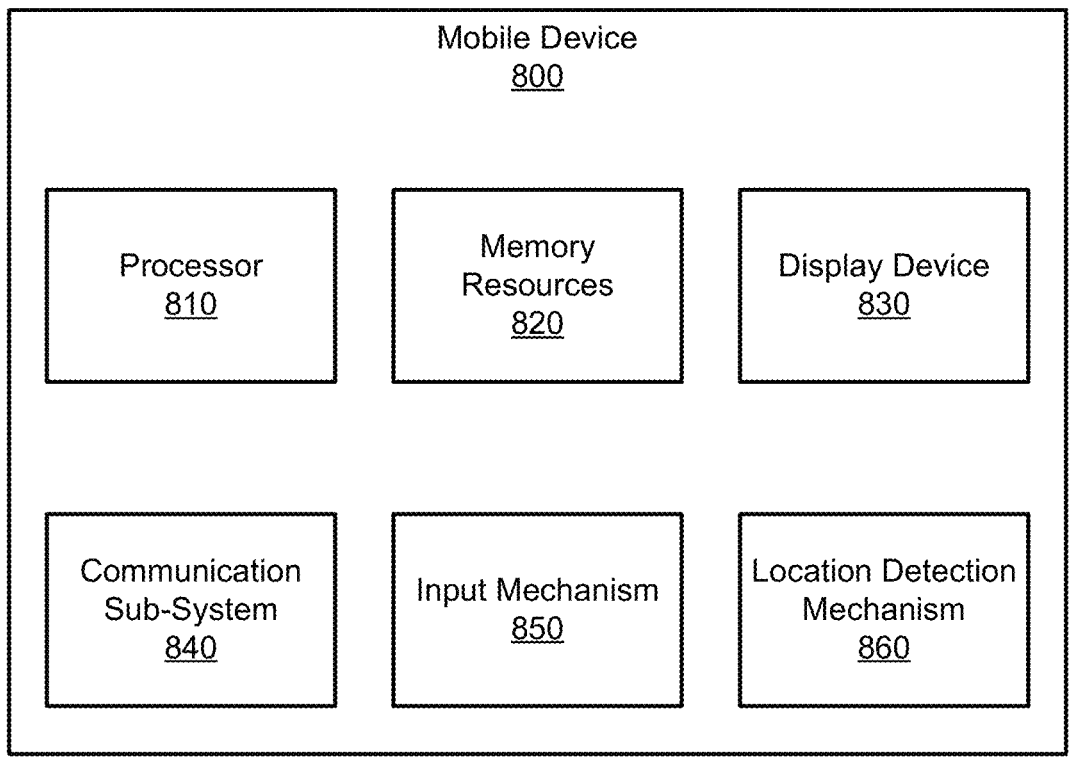
FIG. 8 illustrates an example hardware architecture of a mobile device, such as a rider device or a provider device, in accordance with some embodiments.

FIG. 8 illustrates a mobile computing device upon which examples described herein may be implemented. In one example, a mobile device 800 may correspond to a mobile computing device, such as a cellular device that is capable of telephony, messaging, and data services. The mobile device 800 can correspond to a rider device 100 or a provider device 110. Examples of such devices include smartphones, handsets or tablet devices for cellular carriers. The computing device 800 includes a processor 810, memory resources 820, a display device 830 (e.g., such as a touch-sensitive display device), one or more communication sub-systems 840 (including wireless communication sub-systems), input mechanisms 850 (e.g., an input mechanism can include or be part of the touch-sensitive display device), and one or more location detection mechanisms (e.g., GPS component) 860. In one example, at least one of the communication sub-systems 840 sends and receives cellular data over data channels and voice channels.

The processor 810 is configured with software and/or other logic to perform one or more processes, steps and other functions described with implementations, such as described by FIGS. 1 through 6, and elsewhere in the application. The processor 810 is configured, with instructions and data stored in the memory resources 820, to operate a client application as described in FIGS. 1 through 6. In some embodiments, the rider device 100 executes a rider client application, and the provider device 110 executes a different, provider client application. Instructions for operating the client application in order to display various user interfaces can be stored in the memory resources 820 of the computing device 800.

The GPS component 860 can determine location information, such as the geographic location of the mobile device 800. The geographic location of the mobile device 800 can be wirelessly transmitted to the travel coordination system 130 via the communication subsystems 840 periodically or as part of ordinary communication with the travel coordination system 130. The travel coordination system 130 can receive the geographic location from the mobile device 800 (or a user-specific location data point corresponding to a selected pickup location) and can select a provider to service a trip request from a rider based on the geographic location. The travel coordination system 130 can also transmit a notification to the mobile device 800 via the communication sub-systems 840 if the trip price estimate is less than a target price set by the rider and the travel coordination system is able to service the trip request. The notification can be processed by the processor 810 to provide the notification as content as part of a user interface on the display 830.

For example, the processor 810 can provide a variety of content to the display 830 by executing instructions and/or applications that are stored in the memory resources 820. One or more user interfaces can be provided by the processor 810, such as a user interface for the service application. While FIG. 8 is illustrated for a mobile device, one or more examples may be implemented on other types of devices, including full-functional computers, such as laptops and desktops (e.g., PC).

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, from a rider device at a travel coordination system, a trip request comprising the pick-up location for the rider, a target trip price, and a departure timeframe;
   accessing a plurality of rider devices within a geographic region including the pick-up location;
   monitoring a number of riders viewing a client application operating on a rider device of the plurality of rider devices;
   accessing a plurality of provider devices within the geographic region;
   determining trip price estimation data that is based, at least in part, on trip demand data corresponding to a demand for trips from riders within the geographic region, based on the monitoring the number of the riders viewing the client application, and a supply for trips from providers within the geographic region, based on the accessing the plurality of provider devices;
   generating, by the travel coordination system, a probability that the trip price will be less than or equal to the target trip price at an instance in time during the departure timeframe, the probability being generated based on the trip price estimation data;
   responsive to the generated probability being greater than a threshold:
   selecting a provider from a plurality of providers, at least in part, based on the pick-up location and a geographic location of the provider; and
   sending an assignment request to a provider device of the selected provider.

2. The method of claim 1, further comprising:
monitoring a trip price estimate of a trip from the pick-up location to a destination during the departure timeframe, wherein monitoring the trip price comprises:
generating the trip price estimate based on the trip price estimation data.

3. The method of claim 2, wherein selecting a provider and sending an assignment request are performed responsive to the trip price estimate being less than the target trip price during the departure timeframe.

4. The method of claim 1, further comprising:
determining an actual trip price for the trip from the pick-up location to a destination; and
processing a payment from an account for the rider for a minimum of the actual trip price and the target trip price.

5. The method of claim 1, further comprising:
responsive to the generated probability not meeting the threshold, prompting the rider to submit a new trip request.

6. The method of claim 1, wherein the trip price estimation data further comprises provider supply data describing a supply of providers within the geographic region.

7. The method of claim 1, wherein the trip demand data comprises a rate at which riders who open a client application operating on the rider device submit a trip request.

8. The method of claim 1, wherein the trip price estimation data is further based, at least in part, on one or more of: a duration of the trip, a distance of the trip, an approximate departure time, an estimated time of arrival for the trip, and traffic conditions within the geographic region.

9. The method of claim 1, further comprising:
determining an actual trip price for the trip from the pick-up location to a destination;
determining a difference between the actual trip price and the target trip price; and
providing, to an account for the rider, an amount of credits to be used on future trips with the travel coordination system, the amount of credits equaling the difference between the actual trip price and the target trip price.

10. A non-transitory computer-readable storage medium storing computer program instructions executable by a processor to perform operations comprising:
receiving, from a rider device at a travel coordination system, a trip request comprising the pick-up location for the rider, a target trip price, and a departure timeframe;
accessing a plurality of rider devices within a geographic region including the pick-up location;
monitoring a number of riders viewing a client application operating on a rider device of the plurality of rider devices;
accessing a plurality of provider devices within the geographic region;
determining trip price estimation data that is based, at least in part, on trip demand data corresponding to a demand for trips from riders within the geographic region, based on the monitoring the number of the riders viewing the client application, and a supply for trips from providers within the geographic region, based on the accessing the plurality of provider devices;
generating a probability that the trip price will be less than or equal to the target trip price at an instance in time during the departure timeframe, the probability being generated based on the trip price estimation data;
responsive to the generated probability being greater than a threshold:
selecting a provider from a plurality of providers, at least in part, based on the pick-up location and a geographic location of the provider; and
sending an assignment request to a provider device of the selected provider.

11. The computer-readable storage medium of claim 10, further comprising:
monitoring a trip price estimate of a trip from the pick-up location to a destination during the departure timeframe, wherein monitoring the trip price comprises:
generating the trip price estimate based on the trip price estimation data.

12. The computer-readable storage medium of claim 11, wherein selecting a provider and sending an assignment request are performed responsive to the trip price estimate being less than the target trip price during the departure timeframe.

13. The computer-readable storage medium of claim 10, further comprising:
determining an actual trip price for the trip from the pick-up location to a destination; and
processing a payment from an account for the rider for a minimum of the actual trip price and the target trip price.

14. The computer-readable storage medium of claim 10, further comprising:
responsive to the generated probability not meeting the threshold, prompting the rider to submit a new trip request.

15. The computer-readable storage medium of claim 10, wherein the trip price estimation data further comprises provider supply data describing a supply of providers within the geographic region.

16. The computer-readable storage medium of claim 10, wherein the trip demand data comprises a rate at which riders who open a client application operating on the rider device submit a trip request.

17. The computer-readable storage medium of claim 10, wherein the trip price estimation data is further based, at least in part, on one or more of: a duration of the trip, a distance of the trip, an approximate departure time, an estimated time of arrival for the trip, and traffic conditions within the geographic region.

18. The computer-readable storage medium of claim 10, further comprising:
determining an actual trip price for the trip from the pick-up location to a destination;
determining a difference between the actual trip price and the target trip price; and
providing, to an account for the rider, an amount of credits to be used on future trips with the travel coordination system, the amount of credits equaling the difference between the actual trip price and the target trip price.

19. A system comprising:
a processor; and
a non-transitory, computer-readable medium comprising computer-executable instructions that, when executed by a processor, cause the processor to perform steps comprising:
receiving, from a rider device at a travel coordination system, a trip request comprising the pick-up location for the rider, a target trip price, and a departure timeframe;
accessing a plurality of rider devices within a geographic region including the pick-up location;

monitoring a number of riders viewing a client application operating on a rider device of the plurality of rider devices;

accessing a plurality of provider devices within the geographic region;

determining trip price estimation data that is based, at least in part, on trip demand data corresponding to a demand for trips from riders within the geographic region, based on the monitoring the number of the riders viewing the client application, and a supply for trips from providers within the geographic region, based on the accessing the plurality of provider devices;

generating a probability that the trip price will be less than or equal to the target trip price at an instance in time during the departure timeframe, the probability being generated based on the trip price estimation data;

responsive to the generated probability being greater than a threshold:
  selecting a provider from a plurality of providers, at least in part, based on the pick-up location and a geographic location of the provider; and
  sending an assignment request to a provider device of the selected provider.

20. The system of claim 19, further comprising:
monitoring a trip price estimate of a trip from the pick-up location to a destination during the departure timeframe, wherein monitoring the trip price comprises:
generating the trip price estimate based on the trip price estimation data.

* * * * *